July 25, 1933.  C. E. FURGASON  1,919,465
HYDRAULIC BRAKE
Filed Jan. 16, 1931   2 Sheets-Sheet 1

INVENTOR
Claude E. Furgason.
BY
Harness, Dickey, Pierce & Hann
ATTORNEYS.

July 25, 1933.  C. E. FURGASON  1,919,465
HYDRAULIC BRAKE
Filed Jan. 16, 1931    2 Sheets-Sheet 2

INVENTOR
Claude E. Furgason.
BY
Harness, Dickey, Pierce & Hann
ATTORNEYS.

Patented July 25, 1933

1,919,465

UNITED STATES PATENT OFFICE

CLAUDE E. FURGASON, OF LANSING, MICHIGAN

HYDRAULIC BRAKE

Application filed January 16, 1931. Serial No. 509,158.

This invention relates to brake mechanism for motor vehicles and particularly to such mechanism as employs a liquid in the connection between the actuating mechanism and the vehicle wheel brakes, the principal object being the provision of a so called "master cylinder" for such brake mechanism.

Other objects of the invention are to provide a master cylinder having two distinct rates of discharge of liquid therefrom; to provide a master cylinder in which the first or initial movement thereof discharges into the braking system a relatively large amount of liquid under a relatively small pressure, and then discharges into the braking system a smaller volume of liquid under a relatively greater pressure; to provide means for controlling the pressure of the liquid initially discharged from such master cylinder; and to provide means for relieving the master cylinder of the necessity of working against the initial pressure built up when once the maximum pressure therein has become effective.

Other objects of the invention are to provide means whereby a maximum of pressure may be applied to the braking system of a motor vehicle with a minimum amount of pedal movement; to provide a construction by means of which only a relatively small movement of the actuating pedal is necessary to take up the slack in the braking system and place the brakes into contact with their drums, the greater proportion of the pedal travel being available for forcing the brake elements into contact with their drums with relatively great force; and to provide means whereby the initial movement of the actuating pedal may be utilized to take up the slack in a braking system and move the braking elements into contact with their drums, regardless of the amount of wear of the brake elements, and still allow a relatively great amount of pedal movement for applying a relatively great force to urge the brake element into firmer contact with their respective drums.

The above being among the objects of the present invention the same consists in certain novel features of construction and combinations of parts to be hereinafter described with reference to the accompanying drawings and then claimed, having the above and other objects in view.

In the accompanying drawings which show a suitable embodiment of the present invention and in which like numerals refer to like parts throughout the several different views:

Fig. 5 (Sheet 1) is an enlarged fragmentary sectional view taken in the same planes as Figs. 2, 3 and 4 and illustrating more clearly the construction of the relief valve for limiting the pressure on the liquid in the master cylinder during the initial phase of movement thereof.

Figure 2:
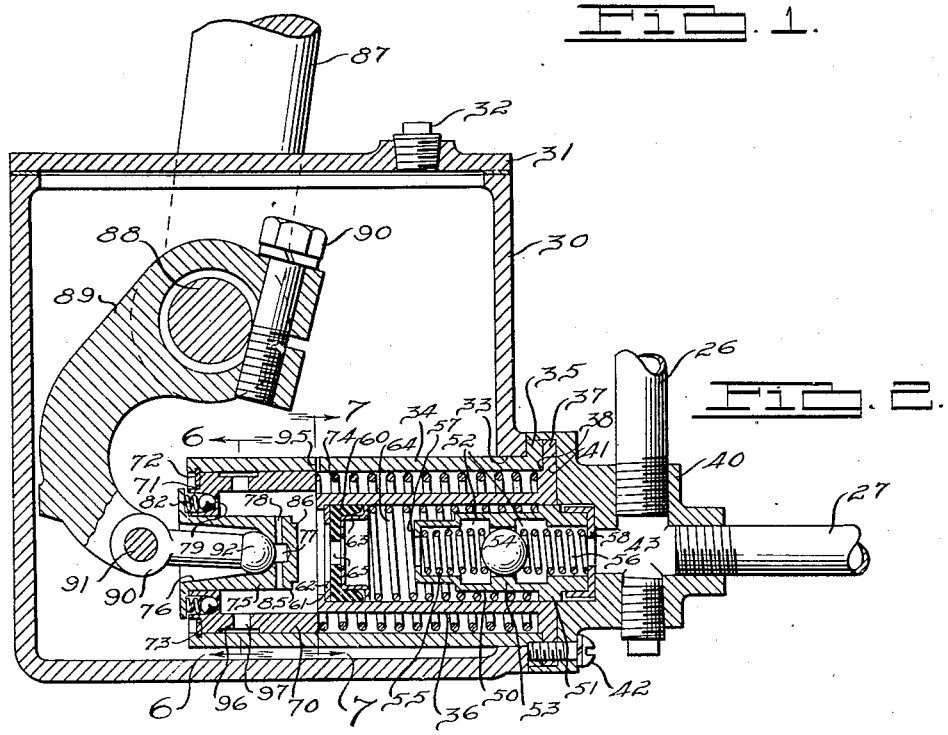
Fig. 2 is an enlarged vertical sectional view taken centrally through the master cylinder of the brake mechanism shown in Fig. 1, as on the line 2—2 of Fig. 1, and showing the mechanism of the master cylinder in the position which it assumes while in inoperative position.
Figure 6:
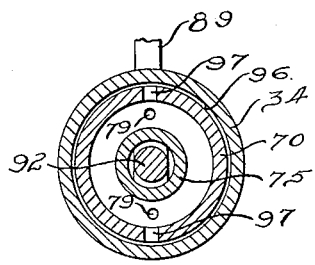
Figure 7:
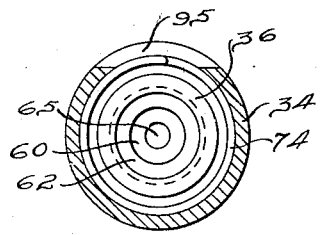

Figs. 6 and 7 are transverse sectional views taken respectively on the lines 6—6 and 7—7 of Fig. 2.

It is, of course, generally understood in connection with the braking systems for motor vehicles that, for the sake of ease in operation, it should be possible to effectively apply the brakes with a minimum amount of effort on the part of the operator. Automotive engineers have been working on this problem ever since the advent of automobiles, but it has become of increasing importance since the advent of four wheel brakes and motor vehicles capable of quicker acceleration and higher speeds. In attempting to obtain better conditions in this respect the designers have been limited by the amount of pedal travel that is permissible in connection with the brakes and during which travel all of the slack or lost motion in the connections between the operating pedal and the brake mechanism on the wheels must be taken up, and the brake elements moved into contact with the brake drums but sufficient travel must remain to permit a relatively high force to be exerted to urge the brake elements into firm frictional engagement with the brake drum. Where four wheel brakes are involved, as in the majority of the present day motor vehicles, greater slack or lost motion must be taken into consideration, together with the necessary pedal travel to overcome the same, and this has resulted in the condition in which great care is exercised in eliminating all possible lost motion in a braking system, and has necessitated that very little of the pedal travel must be taken up in moving the brake elements into contact with the brake drums. This last necessity has made it imperative that as little clearance as possible be permitted between the brake elements and the brake drums when the brakes are in operative position, and this in turn has resulted in a condition whereby present day brakes must be frequently adjusted in order to maintain the clearance between the brake element and the brake drum at a minimum during inoperative periods.

The present invention deals with a construction for obtaining those results generally admitted to be most desirable in this connection, in that only a relatively small initial movement of the actuating pedal is required to take up the slack in the braking mechanism and to place the brake elements into contact with their drums, (and this regardless of a relatively great amount of clearance between the brake elements and the drum during inoperative periods) a relatively great amount of pedal travel remaining for forcing the brake element into the drum under relatively great pressure. In this connection, it will be apparent that, although I have shown in the drawings the present invention incorporated in a full hydraulic braking system, it is not necessary in all cases that the system be fully hydraulic, but the so-called "master cylinder" embodying the present invention may be incorporated with systems which may be partly hydraulic and partly mechanical.

Likewise while I have shown the so-called "master cylinder" as being operated through a foot pedal, means other than a foot pedal may be employed for actuating the same.

Figure 1:
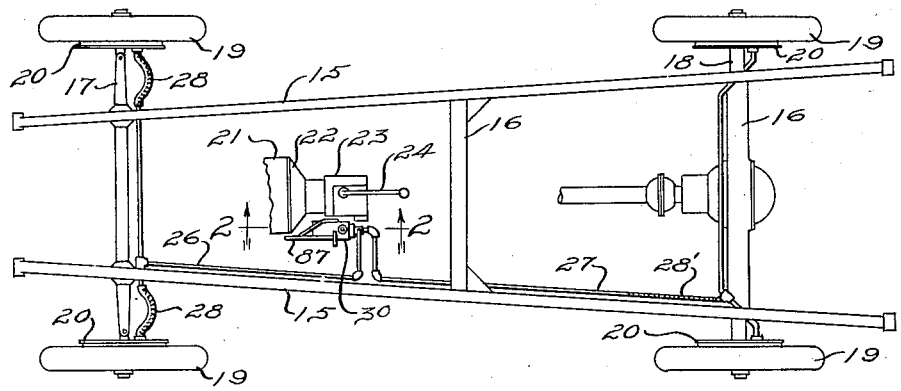
Fig. 1 is a more or less diagrammatic plan view of a motor vehicle chassis illustrating the application of a hydraulic braking system in connection therewith, it being understood that parts of such chassis not essential to the present invention have been eliminated from the figure.

Referring to the drawings and particularly to Fig. 1, I show a motor vehicle chassis including frame side rails 15 connected together by cross members such as 16. Front and rear axles 17 and 18 respectively are suitably connected to the chassis frame in a conventional manner (not shown). Each of the axles carries at its opposite end a wheel 19, and each wheel 19 carries a brake drum 20 within which is located a suitable type of hydraulically actuated brake mechanism which may be of any conventional type and which, therefore, is not shown in detail. A fragment of the engine 21 for the vehicle is shown as being provided with a clutch housing 22 to the rear end of which is secured the usual transmission 23, and which is provided with the usual manually controllable gear shift lever 24.

In the particular illustration, I show the master cylinder embodying the present invention as being secured to the side of the transmission 23, this being the conventional location for such master cylinders. Suitable conduits such as 26 and 27 lead from the master cylinder to the front and rear wheel brakes respectively, the conduits for the front brakes embodying a flexible element 28 to permit free movement of the front wheels for steering and springing purposes, and the conduit 27 with a flexible element 28' to permit springing action of the rear wheels.

Figure 3:
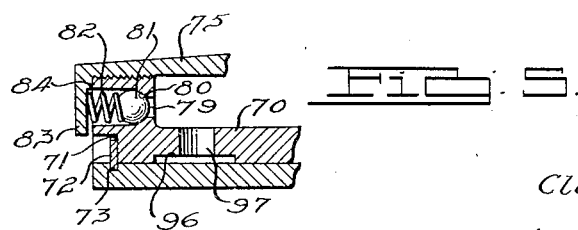
Fig. 3 is a view similar to Fig. 2 but showing a fragment thereof only, and illustrating the position which the parts assume after completion of the initial movement of the brake pedal and before a substantial amount of the secondary movement of the device has occurred.
Figure 3:
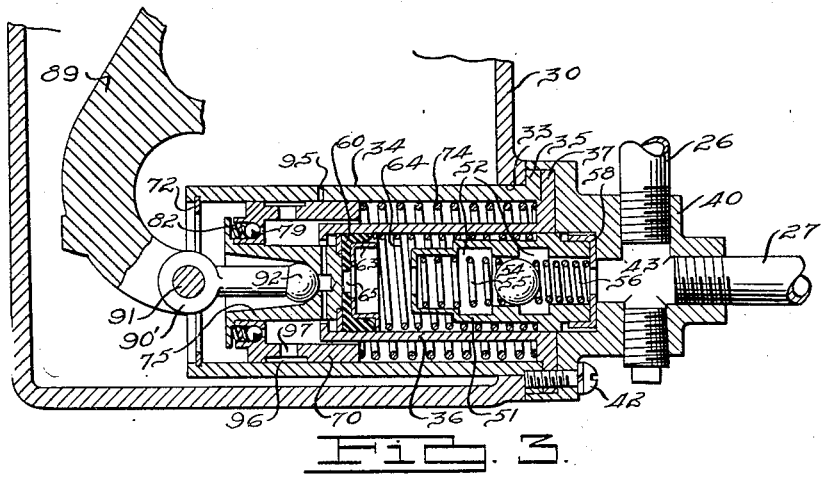
Figure 4:
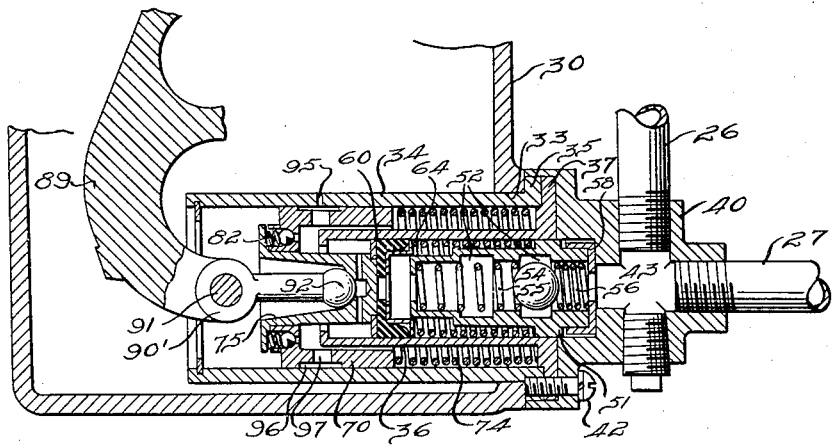
Fig. 4 is a view similar to Fig. 3 but showing the position of the various parts of the apparatus after a substantial amount of the secondary movement of the device has occurred.

Referring to Figs. 2, 3 and 4 the master cylinder is shown as comprising a casing 30 which serves both to house the operative parts of the master cylinder mechanism and as a reservoir for the reserve braking fluid. The casing 30 is provided with a removable cover 31 which, in turn, is preferably provided with a removable plug 32, enabling the system to be charged, and permitting additional fluid to be inserted into the casing from time to time as needs may require. In the rear wall of the casing 30 and adjacent the bottom thereof an opening 33 is provided and, received within this opening is a cylinder 34 provided with an outstanding flange 35 at its outer end which overlies the margins of the opening 33 and serves as a means for locating and sealing the cylinder 34 to the casing 30.

Received within the cylinder 34 in spaced and concentric relation with respect thereto is a smaller and shorter cylinder 36 which is provided at its outer end with an outwardly extending radial flange 37, the flange 37 being stepped as at 38 to form a pilot for reception in the bore of the cylinder 34, thereby to maintain the cylinders 34 and 36 in concentric relationship. The outer portion of the flange 37 overlies the flange 35. A casing member 40, preferably provided with a recess 41 which receives both the flanges 35 and 37, closes the open end of the cylinder 36 and is provided with screws 42 which extend through the flange 37 and are threaded into the flange 35, thus making a unitary assembly of the cylinders 34, 36 and casing 40 together with the various mechanisms that are contained within the cylinders and that will presently be described. Separate means, not shown, are employed for securing the casing 40 to the casing 30. It will be further noted that the casing 40 is provided with a bore 43 which communicates with the ducts 26 and 27 previously described.

Within the cylinder 36 is a hollow member 50 provided adjacent one end with a peripheral flange 51 which fits the bore of the cylinder 36 and maintains the member 50 centrally therein. The cylindrical bore of the member 50 is enlarged as at 52 on either side of the central portion 53 thereof and a ball 54 of a diameter sufficient to be relatively closely received by the portion 53 is located therein and normally closes the portion 53 against the flow of fluid therepast. Coil springs 55 and 56 constantly exert their respective pressures in an endeavor to hold the ball 54 centrally within the portion 53. The spring 55 is maintained under compression between the ball 54 and the inturned shoulder 57 at the forward end of the member 50, and the spring 56 is held under compression between the ball 54 and the annular washer member 58 encircling the rear end of the member 50 and clamped in position between the member 50 and the casing 40. This part of the mechanism namely, the member 50, ball 54 and cooperating springs 55 and 56 are provided in order to constantly maintain a slight pressure on the liquid between the master cylinder and the wheel brakes during inoperative periods of the braking mechanism, and forms no part of the present invention, it being the subject matter of an application for Letters Patent of the United States for Improvements in hydraulic brakes, filed by Horace T. Thomas on July 9, 1928, Serial No. 291,246.

Within the outer end of the cylinder 36 is received a piston 60 of the cup-shaped form conventionally employed in connection with hydraulic brakes. The outer end of the cylinder 36 is provided with a small inwardly turned flange 61 against which normally rests an annular washer member 62 which forms a backing member for the piston 60 when the piston 60 is pressed inwardly. Received within the open end of the piston 60 is a cup-shaped washer member 63, the rim of which is flared outwardly and is freely spaced from the open end of the piston 60 so as not to restrict the rim of the piston from yielding under the pressure of the fluid in the cylinder 36, thereby to effect a more perfect seal. Held under compression between the rim of the washer member 63 and the flange 51 of the member 50 is a coil spring 64 which thus serves to constantly urge the piston 60 towards the outer end of its stroke and also serves to hold the member 50 against the washer 58 and to clamp the washer 58 against the casing 40. It may be noted here that the piston 60 is provided with a central aperture 65.

Received within the outer end of the cylinder 34 is a cup-shaped piston member 70, its side walls being sufficiently thin as to enable them to be projected into the space between the cylinders 34 and 36, and yet permit the fluid in such space to escape between the piston and the outer wall of the cylinder 36 when the piston 70 is projected into such space. The outer end of the piston 70 is stepped as at 71 and a split washer 72, sprung into a groove 73 in the bore of the cylinder 34 adjacent its outer end, engages the shoulder formed on the piston by the recess 71 and serves to limit the outward movement of the piston in the cylinder. A coil spring 74 encircling the cylinder 36 within the cylinder 34 is maintained under constant compression between the end of the piston 70 and the flange 37 on the cylinder 36, thus constantly urging the piston 70 outwardly against the stop ring 72.

Threaded centrally into the end wall of the piston 70 is a plug member 75 which, when the brakes are in inoperative position extends to a point spaced, from the outer end of the piston 60. The plug member 75 is provided on its forward end with a tapered recess 76, the blind end of which communicates through the passage 77 with the cross passages 78 in the inner end of the plug 75.

As best shown in Fig. 5, the closed end of the piston 70, immediately outwardly of the plug 75, is provided with a plurality of axially parallel passages 79 therethrough. These passages are enlarged to form a shoulder 80, against which a ball 81 is pressed by means of a spring 82 held under compression between the ball and the radially extending flange 83 on the outer end of the plug 75. The flange 83 is stepped as at 84 in order that that portion thereof overlying the passages 79 is slightly spaced from the outer face of the piston 70. It will thus be observed that the balls 81 provide check valves permitting escape of liquid from within the piston 70 out through the opening 79 whenever the pressure within the piston 70 becomes great enough to overcome the force of the spring 82. The reason for this construction will be described later.

It will be observed that the diameter of the plug 75 is slightly less than the diameter of the opening defined by the flange 61 on the forward end of the cylinder 36, and it will also be observed that the inner end of the plug 75 is recessed as at 85 to form a pilot portion 86 on the end thereof of a diameter to be fairly closely received within the openings in the washer 62 which forms a backing for the piston 60.

The brake operating pedal 87 is secured to a shaft 88 which is journalled between opposite sides of the casing 30. Within the casing 30 an arm 89 is clamped on the shaft 88 by means of a screw such as 90. A link-like member 90 is pivoted to the lower end of the arm 89 by means of a pin 91 and the free end thereof is formed to provide a ball 92 thereon which normally seats against the inner end of the tapered opening 76 in the plug 75 and acts to seal the passage 77 against flow of liquid therethrough when the pedal 87 is depressed but momentarily draws away from the end of the opening 76 when the pressure on the pedal 87 is relieved after each braking action. This not only allows a quick return of the pedal but allows a free flow of the reserve fluid into the system. This particular part of the construction forms no part of the present invention, it being the subject matter of an application for Letters Patent of the United States filed June 18, 1928 by Horace T. Thomas for Improvements in hydraulic brakes and serially numbered 286,382.

From the description so far given it will be apparent that there is included in the construction a pair of cylinders of different diameters, each of the cylinders being provided with a piston. It will also be apparent that when the pedal 87 is depressed, as in a braking operation, the first or initial movement of the pedal will be effective only for moving the piston 70 in its cylinder 34 and no movement of the piston 60 in its cylinder 36 will occur at this time. When the piston 70 moves inwardly under the influence of the pedal 87 the liquid displaced in the outer cylinder 34 thereby is caused to flow through the central aperture 65 in the piston 60 and, acting under the ball 54 in the member 50, moves the ball 54 rearwardly a sufficient distance to permit the displaced fluid to flow around the same and out through the ducts 26 and 27 to the brake. In practice, the piston 70 and its cylinder 34 are made of a sufficient diameter, and the piston 70 is allowed sufficient axial movement before the piston 60 is engaged by the plug 75, to take up any lost motion that might exist in the braking connection and to move the braking element into contact with the brake drum, regardless of the clearance between the brake elements and their drums due to wear.

It will be apparent, however, due to the diameter of the piston 70 required to accomplish this result, that sufficient force could not be applied to the braking elements to force them into that firm frictional engagement with their brake drums necessary to obtain an effective braking effort, with the leverages and pedal travel conventionally employed in present day motor vehicles, without the application of excessive pressure to the foot pedal by the operator. Consequently, I have constructed the device so that such excessive pressures will never be necessary in the application of the brakes, and this is accomplished in part by the provision of the ball check valves 81 which are preferably so pressed by the springs 82 that when sufficient pressure has been applied to the liquid within the cylinder 34 by the piston 70 to take up the lost motion and to place the brake elements into contact with their drums, the balls 81 will be raised from their seats and thereafter, during the initial movement of the piston 70, a limited amount of pressure only will be necessary to depress the pedal 87.

As a matter of fact, I find that if the springs 82 are so tensioned that a pressure of fifty pounds per square inch on the fluid within the piston 70 will cause them to be lifted from their seats, sufficient pressure will be applied to the braking system to take up the slack and to move the braking elements into contact with their respective drums, and this with the application of but a relatively light pressure on the pedal 87. It might be noted here that there is sufficient clearance between the inner wall of the piston 70 and the outer wall of the cylinder 36 as to permit free escape of any liquid trapped between the cylinders 34 and 36 when the skirt of the piston 70 moves between them.

As the piston 70 continues to move inwardly during the application of the brakes, as soon as the slack is taken up in the various connections and the braking elements are put into contact with their respective brake drums, if the piston 70 has not, by that time, moved inwardly a sufficient distance to bring the end of the plug 75 into contact with the piston 60, the excess liquid still remaining within the piston 70 will escape past the check ball valves 81 and out into the reserve body of liquid in the casing 30. As soon as the piston 70 has moved far enough to bring the plug 75 into contact with the piston 60 the end 86 of the plug 75 will be received within the central opening of the washer member 62 and against the outer face of the piston 60 and will exert a compressive pressure thereon before the recessed portion 86 of the plug 75 embraces the outer face of the washer 62. This seals the contents of the cylinder 36 against escape out through the piston 60. The relation of the parts in this position is clearly indicated in Fig. 3.

With the parts in the position indicated in Fig. 3 it will be apparent that, upon a continued depression of the pedal 87, as indicated in Fig. 4, the piston 70 and plug 75, in moving inwardly will carry with them the piston 60 and will cause a further and greater pressure to be applied upon the fluid in the cylinder 36 and consequently, within the braking system. The diameter of the cylinder 36 and co-operating piston 60 being relatively small, it will be apparent that a relatively light pressure upon the pedal 87 will enable a relatively great pressure to be built up within the cylinder 36, this pressure being available for forcing the braking elements into contact with their drums in order to exert an effective braking action.

The check balls 81 may be relied upon for releasing the liquid displaced within the cylinder 34 and externally of the cylinder 36 during this last phase of movement, but inasmuch as this has the effect of slightly increasing the pressure necessary to cause the corresponding movement of the brake pedal 87 I prefer to provide means whereby such trapped liquid is permitted to flow freely out of the cylinder 34 during such movement. The specific means provided in the construction shown comprises first a transverse slot 95 in the upper wall of the cylinder 34. The slot 95 is preferably so positioned that when the piston 70 is in its extreme outer or inoperative position, its inner end uncovers the slot 95 which thereby serves to permit liquid from the reserve supply to flow into the cylinder 34 under the influence of gravity, or to permit the escape of any air that may have become trapped within the cylinder 34. I then provide the piston 70 with an annular recess 96 in its outer wall and provide a plurality of openings 97 connecting the recess 96 with the interior of the piston. The recess 96 is so positioned with respect to the length of the piston 70 that as soon as the initial movement is imparted to the piston 70 during a braking operation, the groove 95 is closed by the piston 70 and is maintained in closed position until the plug 75 has contacted with the piston 60 and has preferably moved it inwardly a slight distance so as to insure its seal, at which time, or slightly thereafter, the groove 96 begins to register with the slot 95 and thereafter permit the liquid within the piston 70 to flow freely out through the passages 97, groove 96, and slot 95 into the reserve supply of fluid in the casing 30.

When the pedal 87 is released after each braking application, the pedal 87 is immediately returned to inoperative position by spring means, not shown, thus drawing the ball 92 on the end of the link 91 out of sealing relation with respect to the passage 77 in the plug 75 and permitting the reserve supply of fluid in the casing 30 to freely flow into the cylinder. The fluid within the system is urged back into the master cylinder both by the action of the spring 74 which presses the piston 70 outwardly and the pressure of the spring 64 which presses the piston 60 outwardly, but also by the usual spring means, not shown, which constantly urge the friction elements of the wheel brakes out of contact with the drums. The pressure of the liquid in the system now forces the ball 54 to the left, as viewed in the drawings, a sufficient distance to permit the fluid to flow around the same until such time as the pressure remaining on the fluid in the system is sufficient only to counterbalance the force of the spring 55 which thereupon moves the ball 54 back into sealing relationship with respect to the portion 53 to thus retain the liquid remaining in the system under a slight positive pressure.

While I have shown but one specific embodiment of the present invention, it will be obvious that various modifications and changes may be made in the specific embodiment of the invention shown without departing from the spirit or substance of the broad invention, the scope of which is commensurate with the appended claims.

I claim as my invention:

1. A master cylinder device for hydraulic brakes including a casing, a pair of fixed concentric cylinders in said casing, a piston movable in each of said cylinders, a single actuating member for both of said pistons operable to move one of said pistons before the other, and means for rendering the first moved piston ineffective for pumping purposes upon movement of the second moved piston.

2. A master cylinder device for hydraulic brakes including a casing, a pair of cylinders of different diameters concentrically mounted therein, a piston in each of said cylinders, an actuating lever, means operable to connect said lever with the larger of said pistons only during one portion of the stroke thereof whereby to impart movement thereto during the initial period of the stroke of said lever, and means connecting said pistons together for equal movement during another part of the stroke of said lever.

3. A fluid brake actuating mechanism comprising a pair of fixed concentric cylinders of different diameters, a piston for each cylinder, the pistons being relatively movable, the piston in the inner cylinder being formed with a fluid passage therethrough, the piston in the outer cylinder being provided with a boss adapted after a predetermined degree of movement in the outer cylinder to contact with the end of the piston in the inner cylinder to close the opening through said latter mentioned piston, means for reciprocating the outer piston and a conduit leading from the inner cylinder to the brakes.

4. A hydraulic brake actuating mechanism comprising an outer casing, a pair of fixed concentric cylinders of different diameters disposed within the casing, individual pistons disposed in the cylinders, the piston in the outer cylinder being cup-shaped and having transverse openings through the skirt portion thereof and an opening formed in the outer cylinder wall whereby to permit emission of the fluid from the cylinder after a predetermined degree of movement of the piston, the piston in the outer cylinder having a boss portion adapted after a predetermined degree of movement to engage the end of the piston in the inner cylinder.

5. In combination with a master pressure producing means, a pair of fixed cylinders, a piston in each of said cylinders, said pistons being relatively movable, means for moving one of said pistons, means co-operating between said pistons adapted to impart simultaneous positive movement to the other piston only after an initial movement of the first moved piston, and means common to both of said pistons operated by the movement thereof.

6. In combination with a master pressure producing means, a pair of fixed concentric cylinders, a piston in each of said cylinders, said pistons being arranged in end-to-end relationship and movable independently of each other, a discharge connection for one of said cylinders, the corresponding of said pistons having a passage therethrough, means normally spacing said pistons from each other, and means for moving the other of said pistons, said other piston adapted to engage the first mentioned piston only after an initial movement thereof to close said passage therein and thereafter impart equal positive movement thereto.

7. A master cylinder device for hydraulic brakes including a liquid casing, a pair of fixed concentric cylinders in said casing, a piston in each of said cylinders, a single means for successively and then simultaneously moving said pistons, and means for relieving the pressure built up in said cylinder having the first moved piston during the simultaneous movement of both said pistons.

8. In combination with a master pressure producing means, a pair of cylinders, a piston in each of said cylinders, said pistons being independently movable and normally spaced from each other, and means for moving one of said pistons into contact with the other of said pistons and thereafter causing equal movement of both of said pistons.

9. In combination with a master pressure producing means, a pair of cylinders, a piston in each of said cylinders, said pistons being independently movable and normally spaced from each other, means for moving one of said pistons into contact with the other of said pistons and thereafter causing equal movement of both of said pistons, the first moved piston discharging through the second moved piston, and means for stopping said discharge through said second moved piston upon movement thereof.

10. In combination with a master pressure producing means, a pair of fixed cylinders of different diameters, a piston for each of said cylinders, said pistons being independently movable, means normally spacing said pistons from each other, means common to both of said cylinders adapted to be operated by movement of said pistons therein, means for moving the larger of said pistons whereby the fluid displaced thereby is fed to said common means, said larger piston causing movement of said smaller piston only after an initial movement of said larger piston, and means rendering ineffective the connection between said larger cylinder and said common means upon said movement of said smaller piston.

CLAUDE E. FURGASON.